(12) United States Patent
Stone et al.

(10) Patent No.: US 6,489,375 B2
(45) Date of Patent: Dec. 3, 2002

(54) LOW VOC CATIONIC CURABLE LITHOGRAPHIC PRINTING INKS

(75) Inventors: Edward Stone, Morris Plains, NJ (US); Gordon Kotora, Clifton, NJ (US); Mikhail Laksin, Scotch Plains, NJ (US); Subhankar Chatterjee, Hampton, NJ (US); Bhalendra J. Patel, Kendall Park, NJ (US)

(73) Assignee: Sun Chemical Corporation, Fort Lee, NJ (US)

(*) Notice: Subject to any disclaimer, the term of this patent is extended or adjusted under 35 U.S.C. 154(b) by 0 days.

(21) Appl. No.: 09/956,701

(22) Filed: Sep. 20, 2001

(65) Prior Publication Data

US 2002/0040073 A1 Apr. 4, 2002

Related U.S. Application Data

(60) Division of application No. 09/500,562, filed on Feb. 9, 2000, now abandoned, and a continuation-in-part of application No. 09/500,562, which is a division of application No. 09/111,015, filed on Jul. 7, 1998, now abandoned, and a continuation-in-part of application No. 09/111,015.

(51) Int. Cl.[7] .................................................. C08F 2/48
(52) U.S. Cl. ........................... 522/84; 522/83; 522/85; 522/86; 522/88; 522/31; 522/64; 522/909; 522/100; 522/102; 522/170; 522/181; 522/150; 522/153; 522/157; 522/166; 522/168; 522/169; 523/106; 106/31.1; 106/31.16; 106/31.2
(58) Field of Search .............................. 522/81, 84, 31, 522/85, 25, 86, 88, 909, 64, 100, 102, 170, 181, 150, 153, 157, 166, 168, 169; 523/106; 106/31.3, 31.16, 31.2

(56) References Cited

U.S. PATENT DOCUMENTS

| | | | | | |
|---|---|---|---|---|---|
| 3,615,385 A | * | 10/1971 | Lind | .......................... | 430/49 |
| 4,045,231 A | * | 8/1977 | Toda et al. | ............... | 430/286.1 |
| 4,108,747 A | * | 8/1978 | Crivello | ........................ | 522/31 |
| 4,304,601 A | * | 12/1981 | Sharp | ........................ | 524/261 |
| 4,556,427 A | * | 12/1985 | Lewis | ........................ | 106/31.6 |
| 5,116,411 A | * | 5/1992 | O'Neill et al. | ............... | 524/141 |
| 5,281,569 A | * | 1/1994 | Amon et al. | ................. | 503/201 |
| 5,658,964 A | * | 8/1997 | Amon et al. | ................... | 522/31 |
| 5,708,047 A | * | 1/1998 | Kamen et al. | ................. | 522/31 |
| 5,721,020 A | * | 2/1998 | Takami et al. | ............... | 427/508 |
| 5,820,932 A | | 10/1998 | Hallman et al. | ............. | 427/261 |
| 5,882,842 A | * | 3/1999 | Akaki et al. | .............. | 430/280.1 |

FOREIGN PATENT DOCUMENTS

| | | | | | |
|---|---|---|---|---|---|
| EP | 0 432 093 | * | 6/1991 | | |
| EP | 0844255 A1 | | 5/1998 | ............. | C08F/2/50 |
| GB | 2 142 279 | * | 1/1985 | | |
| GB | 2 142 279 A | * | 1/1985 | | |
| JP | 7-25922 | * | 1/1985 | | |
| JP | 10-168160 | * | 6/1998 | | |

OTHER PUBLICATIONS

Pappas. UV Curing of Epoxides By Cationic Polymerization, vol. II, Chapter 6, pp. 248–282.*

Blayo e tal. A Comparative Rheological Study of Waterless and Convention Offset Inks., JOCCA, 1993, pp. 164–171.*

UV Curing of Epoxides by cationic polymerization,, Watt, William R., pp. 247–82.

* cited by examiner

*Primary Examiner*—James J. Seidleck
*Assistant Examiner*—Sanza L. McClendon
(74) *Attorney, Agent, or Firm*—Sidney Persley

(57) ABSTRACT

An Offset Lithographic Printing Process employing low VOC lithographic printing ink formulations containing monomeric diluents, curable by cationic polymerization in the presence of fountain solution and resin rheology modifiers compatible with cationic catalysts.

6 Claims, No Drawings

LOW VOC CATIONIC CURABLE LITHOGRAPHIC PRINTING INKS

This application is a Divisional and Continuation-In-Part of application Ser. No. 09/500,562, filed Feb. 9, 2000 now abandoned which was a Divisional and a Continuation-in-Part Application of application Ser. No. 09/111,015, filed July 7, 1998, now abandoned.

FIELD OF THE INVENTION

This invention relates to processes employing novel lithographic printing ink compositions having low amounts of volatile organic components (VOC) that consist of diluents polymerizable by cationic addition polymerization and are curable in the presence of water or fountain solution.

BACKGROUND OF THE RELATED ART

Today, a major goal of national environmental programs is the reduction or elimination of evaporative emissions of organic chemicals into the atmosphere which would eliminate: the health risks associated with continual human exposure to organic vapors in the work-place; the potential contribution of VOC to hydrocarbon and ozone-related pollution of the atmosphere; and the theoretical contribution VOC may make to the atmospheric "greenhouse effect". Manufacturers across the industrial spectrum have been called upon to look at the formulations of their end products and manufacturing processes and change or alter the product formulations or process steps consistent with the national goal. This is a prodigious challenge, one not easily met in the best of circumstances and not achievable without a severe deleterious impact on end-product properties and/or process cost.

Inks typically include a variety of organic components in their formulation such as one or more organic solvents, monomers, oligomers, crosslinking agents, gelling agents and the like, all selected for their contribution to application-specific ink properties. For lithographic printing inks, conventional web offset heatset inks (WOHS) comprise the largest market segment and are, consequently, a most important segment to convert to VOC-free systems. These inks usually contain a pigment, polymeric binders, additives such as driers or talcs, and volatile solvents or diluents. As their name implies, the inks dry by a setting mechanism. The drying takes place by removal of the solvent when the printed article passes through a high temperature oven where solvent is evaporated into the atmosphere. As such, the drying process for these inks presents a significant opportunity for the printing industry to reduce VOC pollutants emanating from their current printing practices. But that opportunity must be captured without severely affecting the physical printing operation and its cost.

WOHS inks have been formulated that eliminate or substantially reduce VOCs by replacing solvents or diluents in the formulation with acrylate monomers and acrylated oligomers which serve as diluents for pigments, etc. These inks are then cured by free radical initiated polymerization to form polymeric binders. In this instance, as a first choice the formulation is restricted to monomers that polymerize by well recognized free radical initiation mechanisms, where the rate of polymerization is fast and commensurate with the web print speeds of WOHS. When this requirement is factored into the end properties required of the ink polymeric binder, the choice of monomer is largely restricted to acrylates and the acrylate moiety. But acrylate monomers are relatively expensive for products of this class. Therefore, when coupled with the additional cost pressures inherent in product reformulation, the use of acrylates to reduce VOC produces a severe upward pressure on the cost of WOHS inks.

It is well known in polymer science that there are other means to catalyzing monomers that yield polymers with physical properties potentially useful in low VOC WOHS inks. These monomers polymerize at rates competitive with those achieved by the free radical polymerization of acrylates and, hence, they are compatible with the speed of WOHS printing. These alternative methods include anionic and cationic catalysis, redox initiation, thermal and electron beam. However, each of these approaches have strengths and weaknesses when considered as a basis for reformulating WOHS inks for lower VOC content. Electron Beam initiated polymerization would, for example, require modifications to the physical printing plant to accommodate new equipment at a potentially steep cost. Ionically catalyzed polymerization would present a challenge to the practical feasibility of the overall offset printing process that takes place in the presence of aqueous fountain solutions.

Fountain solutions are typically an aqueous mixture of chemical components used in off-set printing to keep the non-image area of the lithographic printing plate free of ink and often contain basic components to produce high pH, acidic components for low pH or acid/base buffers designed to maintain an intermediate fountain solution pH of about 3, or at least 5–7. Consequently, one skilled in the art would reasonably expect that fountain solutions to seriously retard or stop inks catalyzed by cationic catalysts from curing.

McKie et al, GB2142279A, describes an energy curable printing ink composition consisting of a cationic polymerizable resin, diluent, photoinitiator, and colorant. However, the printing is a screen ink and screen inks typically have a viscosity between 15 and 60 poises. By contrast, UV curable lithographic inks have a viscosity above 100 poises (R. H. Leach, "The Printing Ink Manual", Fourth Edition, 312 and 498 (1988)). Moreover, screen inks are used in dry transfer printing processes and therefore are not curable in the presence of water or fountain solution.

In general, it is known that water, particularly in the form of high humidity or moisture, poisons anionic and cationic polymerizations. So it would seem unlikely, that any cationically catalyzed ink curing would work in the presence of water or fountain solution; see UV Curing: Science and Technology, Vol. II, Chapter 6, pgs. 248–282, by S. Peter Pappas, Published by Marketing Technology Corp. Thus, offset lithographic printing processes requiring high quality, commercial grade, UV curable lithographic printing ink formulations, polymerizable by cationic addition polymerization and essentially devoid of VOCs and acrylates are desired.

The object of the present invention is to develop a offset lithographic printing process that uses printing ink formulations having a low complement of VOC yet are fully compatible with commercial printing operations.

Another object of the invention is to develop an offset lithographic printing process that uses UV curable printing ink formulations employing cationic catalyst and gelling agents compatible with cationic UV curable systems.

SUMMARY OF THE INVENTION

An offset lithographic printing process employing a printing ink curable by UV radiation in the presence of water or fountain solution wherein the ink comprises: a diluent polymerizable by cationic addition polymerization; a cationic photoinitiator; rheology modifying resin binder and colorant; and has a viscosity greater than 100 poises.

DETAILED DESCRIPTION OF THE INVENTION

The images produced by the novel printing ink formulations of the invention are cured following offset printing by a novel process comprising a surprisingly effective cationic catalytic polymerization of the reactive monomer diluents or derivatized oligomers in the formulation. A binder for the ink system is formed that provides a hard coat and a high gloss printed image. Despite the presence of aqueous fountain solution in proximal contact with the formed image subsequent to printing, it has been found that the cationic polymerization of reactive monomers in the uncured ink image is, nevertheless, readily initiated and effectively cures the printed image.

The cationic polymerization catalyst photoinitiators included in the ink formulations of the invention are cationic catalyst precursors that have the capability of releasing cationic catalysts when acted upon by an appropriate agent. Preferably, the initiators release cationic catalyst upon exposure to an energy source such as heat, light or an electron beam. A useful initiator is one which reacts or rearranges upon exposure to ultraviolet (UV) light to release a cationic catalyst which goes unaffected by fountain solution. A particularly preferred cationic precursor is Cyracure 6990, available from Union Carbide. Upon exposure to UV light and subsequent to printing, Cyracure 6990 releases a super acid, which catalyzes the polymerization of the reactive monomers to form a cured printed image. Heat may also be applied to the printed article during or after the curing step to facilitate or complete curing.

While the instant discovery obviates the need to formulate free radical polymerized inks systems for low VOC, a need for rheology modifiers compatible with these cationic systems was formed. This need however, has been met by the discovery of a useful class of high molecular weight rosin esters that form gel like structures compatible in cationically polymerizable diluents. When these rosin esters are used in the present invention which contains cationically polymerizable diluents, a novel lithographic printing ink or over print coating varnish results wherein the rheology of the ink or varnish is controllable and the cured print image is a hard and glossy and has good adhesion.

Optionally, a non-ink protective top coating for printing can be produced by the invention by eliminating the pigment from the formulation. The composition, so formed, can be advantageously used in off-set printing to form a clear, protective top coating over the cured inked image immediately and subsequent to the printing and image curing sequence of the printing process. The top coating may use similar diluents and catalyst precursors as those employed in the ink and can be cured with a similar UV light source.

The WOHS printing inks of the invention meet the print quality and environmental requirements of having a low or negligible VOC content by using low cost, resin-producing, film forming, monomers as diluents that provide a cost advantage over more conventional low VOC containing acrylates. By resorting to a means other than free radical polymerization, relatively inexpensive monomers can now be used in conjunction with catalyst systems producing inks having cure rates that are fully compatible with WOHS printing speeds. The catalyst initiator systems used in the invention are unique as that they are present as catalyst precursors, preferably cationic photoinitiators, yet they are activated in the curing step of the printing process.

In the present invention, the curing of ink can be carried out with a wide range of monomers or oligomers by means such as thermal initiation, electron beam initiation, or UV initiation. For practical reasons though, ionically catalyzed curing is preferred since the polymerization rates are fast and commensurate with WOHS printing speeds. In addition, the cure step does not require major additions or modifications of the printing apparatus. Also, cationic polymerization proceeds nearly to completion, leaving little or no residue of monomer that may contribute to elevated VOCs. Of the available cure means for the printed ink image, it has been discovered that cationic catalysis works well in the presence of fountain solutions and the resulting properties of the cured ink are excellent.

Diluents

The diluents used in the ink compositions of the invention provide a two-fold function. They are used to replace organic solvents ordinarily used in ink formulations to solubilize the components of the ink. They are also included to polymerize and/or copolymerize (subsequent to printing) the film and binder of the printed ink image. The diluents may be low molecular weight liquid monomers and comonomers including oligomers that contain cationically crosslinkable moieties.

For cationically polymerizable diluent monomers or comonomers, a wide variety of ethylenically unsaturated monomers, oxiranes, oxetanes and oxolanes can be used. Vinyl compounds are an especially useful resource of ethylenically unsaturated compounds for diluent monomers. Although many vinyl monomers are not readily polymerized by cationic polymerization, useful vinyl monomers which may be homopolymerized or copolymerized include alkyl vinyl ethers such as methyl vinyl ether, styrene, alpha alkyl styrene and isobutylene and other alpha olefins.

It is well known that the epoxide group, oxirane, can be readily polymerized by cationic polymerization; consequently, oxirane and substituted oxiranes are a preferred resource to provide diluent monomers useful in the present invention. These oxiranes include oxides of alkenes, alkadienes, cycloalkenes, cycloalkadienes, and oxides of olefinically unsaturated natural products such vegetable oils and natural resins including soya oil, linseed oil, unsaturated fats, unsaturated hydrocarbons, used alone or in combination. Specific examples include vinylcyclohexene dioxide (available from Union Carbide), 1,2,7,8-diepoxyoctane, 3,4-epoxycyclohexylmethyl-3,4-epoxycyclohexane carboxylate (available from Ciba-Geigy), Bis(3,4-epoxy-6-methylcyclohexylmethyl)adipate (available from Union Carbide), Bis(3,4-epoxycyclohexylmethyl) adipate (available from Union Carbide), Butanediol diglycidyl ether, Cresyl glycidyl ether (available from Wilmington Chemical Corp.) and $C_{12}$–$C_{14}$ Alkyl glycidyl ether (available from Ciba-Geigy). Particularly useful oxiranes include limonene dioxide, oxides of linseed oil and oxides of soya oil, employed alone or in combination.

The oxiranes of the present invention have the following structure:

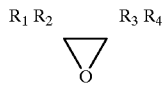

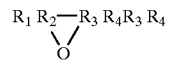

where $R_1$, $R_2$, $R_3$ and $R_4$ are independently selected from hydrogen, alkyl, alkenyl, aryl or cycloalken-diyl when $R_2$ and $R_3$ are taken in combination.

The reactive epoxy functionality of the diluents generally are in relatively low molecular weight monomers. However, it is within the scope of the present invention to include liquid oligomeric epoxidized monomers either alone or in combination with more typical low molecular weight epoxies. Variations such as this are conveniently made to augment the film properties or adhesion of the cured ink. These oligomers can have epoxidation functionality greater than two and may be cycloaliphatic of glycidyl type.

Those skilled in the art will appreciate that these diluents can be used individually or in combination as a mixture. Other co-diluents such as polyols can be used in the combination to enhance certain other properties of the ink such as homogeneity, cure speed or film flexibility.

Cationic Catalyst

The post-print curing of the ink compositions H is carried out by the cationic polymerization of monomeric diluents in contact with Lewis acids or Bronsted catalyst such as HF, $H_2SO_4$, $AlCl_3$, $BF_3$, $FeCl_3$, $TiCl_4$, $CF_3SO_3H$, $ZnCl_2$ and $P_2O_5$. "Super acids" such as those prepared from mixed metal oxides and phosphorous or antimony fluorides can also be employed. Mixed metal oxide super acids are described by M. Hino and by K. Arata, *J. Chem. Soc. Chem. Commun.*,1987, pg. 1259; and in K. Arata and M. Hino, *Proc. 9th International Congress; on Catalysis*,1988, Vol. 4, pg. 1727 and U.S. Pat. No. 5,453,556. However, Lewis acid catalyst are not present in the inks as formulated since the preprinting stability, storability and overall utility of the inks would be compromised by any oligomer and/or high polymer formation. Rather, Lewis acid precursors are preferably used as cationic photoinitiators which, when acted upon, release Lewis acid catalysts, which in turn, initiate diluent polymerization and curing reactions. Such cationic catalyst precursors are defined herein as cationic polymerization catalyst initiators.

While the cationic catalyst is preferably included as a cationic photoinitiator in the ink formulation in another embodiment within the scope of the present invention the photoinitiator or an active cationic catalyst may be added as a portion of a two part ink formulation, i.e., one part containing the cationically curable components of the ink formulation and the other containing the cationic catalyst or photoinitiator. A suitable application means, for example, can combine the two parts at an appropriate moment on the lithographic plate to carry out the curing step of the printing process.

A preferred form of cationic polymerization catalyst initiators are photoinitiators which release active Lewis acid catalyst upon exposure to light, particularly UV light. Photoinitiators are well known in the field of catalysis chemistry and are available from Union Carbide Corporation; Ciba Specialties, Incorporated; Sartomer Corporation and General Electric Corporation. The preferred photoinitiators release super acids upon exposure to UV light according to the reaction:

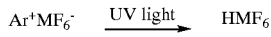

where M is phosphorus or antimony and Ar is an aryl typically selected from a mixed triarylsulfonium, iodonium or ferrocenium salt. Irgacure 261 is a typical ferrocenium salt that releases a super acid catalyst when exposed to UV light. The super acid catalyzes the polymerization and crosslinking of, for example, epoxy groups in the printed ink image with themselves or with hydroxy groups.

UV light initiated cationic chemistry has many advantages over UV light initiated free radical chemistry for the preparation of low VOC inks. First, cationic polymerization is not inhibited by the presence of cationic and anionic polymerization reactions. As a result, the predictability of the success in curing WOHS lithographic inks with cationic catalysts was highly uncertain. Indeed, the course of the research confirmed that certain cationic photoinitiators known in the art, such as m, $m^1$ dimethoxybenzyl tosylate, are moisture sensitive and are inadequate to perform as catalyst initiators for curing WOHS lithographic inks. However, certain cationic polymerization catalyst initiators reported herein were found to be sufficiently insensitive to fountain solution during printing and allowed curing to proceed successfully.

Without intending to be bound by theory, having made the instant discovery, it is now thought that the unexpected curing occurring in the presence of fountain solution is attributable to a combination of factors. First, the typical immiscibility of fountain solution with the inks, especially inks of the invention, strongly inhibit the contamination of the ink phase by fountain solution components. Therefore, the concentration/activity of polymerization retarding components from the fountain solution to be found in the ink phase is small and the rate of any chain terminating or catalyst poisoning reaction is consequently small. On the other hand, cationic addition polymerization reactions such as epoxy polymerization are known to proceed at high rates of reaction, even at room temperature. At the higher ink heat-set temperatures, typically used in the printing process, the reaction rates would be even higher. Accordingly, the competitive rates of reactions of chain termination/catalyst poisoning versus addition polymerization in the ink organic phase are overwhelmingly in favor of diluent addition polymerization unexpectedly and rapid ink curing occurs.

Photoinitiators

Particularly preferred photoinitiators employed in the ink formulations of the present invention are available from Union Carbide Corporation and are mixed triarylsulfonium hexafluoroantimonate salts (UVI-6974) and mixed triarylsulfonium hexafluorophosphate salts (UVI-6990) having the structures:

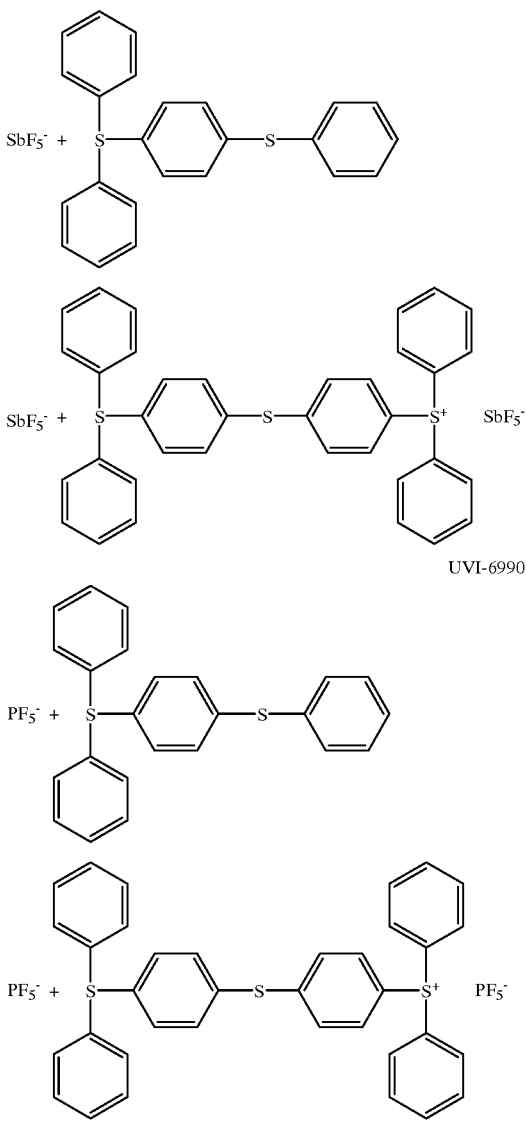

The photoinitiators are preferably used in quantities between 0.5 and 20 weight percent and more preferably in quantities between 5–10 weight percent and most preferably 6 weight percent.

Colorants

Colorants selected for UV cured cationic inks are limited due to the generation of a cationic catalyst that initiates the polymerization and crosslinking of the monomeric diluent groups. The presence of basic components in for example a pigment or a dye colorant, generally amines, can neutralize acid initiators and hinder the curing mechanism thereby reducing the curing speed to a point where printing is retarded. This creates a problem because many pigments are either treated with amines to promote dispersion or contain strong basic groups in their structure. However a wide range of special pigments have been found to be particularly useful in the inks of the present invention and can be employed without seriously reducing printing speeds. These colorants are available in a wide variety of colors and are compatible with UV cationic epoxide curing. Suppliers of dyes and pigments include BASF Corp., Harcros Corp., Sun Chemical Corp., Silberline Corp., U.S. Bronze Hoechst-Celanese Corp., Columbia Chemical Corp., Degussa Corp., Halox Corp. and DuPont Corp.

Rheology Modifying Resins

The key properties needed for the resin systems useful in the present invention are low cost, soluble in the diluent, particularly epoxy diluents, a reactive or non-reactive resin with a melting point of greater than 100 C. and the ability to control the overall rheology of the printing ink.

To control the rheology of the inks of the invention it has been discovered that high molecular weight rosin ester resins can be used as rheology modifiers since these materials form gel type structures when dissolved in the diluents of the invention. Ordinarily, high molecular weight rosin ester resins are not used in acrylate-based low VOC inks because they are insoluble in the diluent system. However, they can dissolve in the low viscosity epoxies and vinyl ether that are the preferred diluents of the invention. Importantly, rosin ester resins do not interfere with the cationic polymerization curing of the inks. Preferred high molecular weight rosin ester resins are known in the art as self structured. These high molecular weight, self structured, rosin ester resins provide the following advantages to the inks of the invention: high elasticity and improved rheology; improved gloss and density due to good flow and emulsion stability on the lithographic press; cured film exhibits good adhesion on plastic, metal and metalized substrates due to low shrinkage; print quality is much better especially on high speed presses; cured ink exhibits good mechanical properties especially when multifunctional epoxy diluents are used.

Rosin ester resins suitable for use in the present invention are well known in the art and are described, in part, in U.S. Pat. No. 5,498,684. They are prepared as derivatives of natural resins as described in Kirk-Othmer *Encyclopedia of Chemical Technology*, Vol. 21, Fourth Edition, 1997, pgs. 291–301, incorporated herein by reference. High molecular weight rosin ester resins are preferred such as those obtained by esterification of abietic acid with pentaerythritol or Diels-Alder maleation of levopimaric acid with maleic anhydride and are available from Westvaco Corporation, Lawter Corporation, Union Camp Corporation and AKZO Corporation. Preferred rosin ester resins include Westvaco RP339, Lawter UR165 and DSM RL-62.

Reactive resins and modified resin systems customarily used in lithographic inks meeting these properties include polyester resins, phenolic resins, hydrocarbon resins, and the like bearing oxygen, vinyl ether or pendant hydroxy functionality.

The following resin systems are particularly suitable for use with the inks of the present invention:

| Trade Name | Type | Source |
|---|---|---|
| Filtrez 615 | rosin-modified phenolic resin | AKZO, Corp. |
| Hybrez 951 | phenolic modified rosin ester resin | Resinall, Corp. |

Gelling Agents

A further method of controlling the rheology of the present ink formulation is to add gelling agents. Traditionally, these gelling agents are inorganic chelating agents that influence the degree and type of viscosity enhancement occurring in the ink. Although inorganic chelating agents are useful in low VOC ink formulations derived for acrylate oligomers and/or monomers, they are not all compatible with the cationic curing systems of the invention and may, in some instances create significant stability problems in the ink formulation. Therefore, gelling varnishes must be tailored for use in cationic systems.

Table 1 lists the weight percent range for each component in the ink of the present invention.

TABLE 1

| Component | Weight % |
|---|---|
| Resin | 20–35 |
| Diluent | 40–60 |
| Catalyst photoinitiator | 3–6 |
| Gelling agent | 0–2 |
| Talc | 0–3 |
| Pigment | 12–16 |
| Wax | 0–2 |

A particularly preferred magenta UV cationic lithographic ink composition is presented in Table 2.

TABLE 2

| Component | Weight % |
|---|---|
| Filtrez 615/LOE* | 50.0 |
| Cationic Photoinitiator | 6.0 |
| Talc | 3.0 |
| Polyethylene wax | 2.0 |
| Resinal/4221 Gel* | 19.0 |
| Epoxy Diluent | 20.0 |

*(Filtrez 615/LOE is 49% Flexol LOE, 21% Filtrez 615 and 30% magenta pigment. Resinall 4221 gel is 33.5% Resinall 950, 66% ERL-4221, and 0.5% AIEM Gellant.)

The following Examples illustrate the process for the preparation and use of the novel inks of the invention.

EXAMPLE 1

An ink was prepared by dissolving a resin in a diluent monomer at about 100 C. using a high speed mixer. The mixture was then cooled to room temperature and the remainder of the components shown below were added. The ink was then ground on a three roll mill.

| Component | Weight % |
|---|---|
| Pentalyn A, modified rosin, Hercules | 33 |
| Heloxy, 2-ethylhexyl glycidyl ether, Shell | 10 |
| Phthalo blue pigment, Sun | 16 |
| Cyracura 6110, an epoxy, Union Carbide | 34 |
| Cyracure 6974, a photoinitiator, Union Carbide | 3 |
| PE wax, Shamrock | 2 |
| Talc | 2 |
| TOTAL | 100 |

Example 2 illustrates the process of printing with the inks and curing the resultant printed product.

EXAMPLE 2

The magenta UV cationic lithographic ink composition in Table 2 was employed in a press trial on a Miehle sheet fed press. The main objective of the trial was to evaluate ink cure in the presence of fountain solution. Data from the press run conditions and run results were as follows:

| Press Run Conditions | |
|---|---|
| Speed of Press | 6500 (impressions per hour) |
| Ink notches | 14 |
| Dahlgren water setting | 24 |
| Print density | 1.39–1.52 |
| Plate | Kodak L |
| Blanket | Day International UV blanket |
| Fountain Solution | Rosos KSP 500 M-5, 6 oz/gal |
| Conductivity | 200 |
| pH | 3.8 |
| Temperature | 72 F. |
| UV lamps | 4 × 200 w/in |

Press Run Results
Print Quality clean prints, no ink in the non-image area
Dot Gain (at 50%) 58%
Print Contrast 40%
Cure tack free, passed thumb test The results demonstrate that the UV light cationic ink of Table 2 cures in the presence of fountain solution.

To these further explore the surprising result of curing these UV cationic lithographic inks in the presence of fountain solution, a different fountain solution formulation was tested, i.e. a basic fountain solution commonly employed for printing with news ink having a pH of 9.5. At this pH, one skilled in the art would expect the fountain solution to seriously inhibit or prevent curing of ink.

EXAMPLE 3

A neat UV light cationic cyan ink was applied to coated paper via a "Little Joe" press and cured using Rapid Cure-6 with 2×300 w/inch UV lamps at a speed of 100 fpm. The ink was then emulsified with a 10% basic fountain solution (Rycoline 704K - pH9.5) for 30 seconds and immediately printed, tested for cure, and compared to a neat sample. The image printed from the emulsified ink also cured at 100 fpm. The emulsified ink was allowed to stand for an additional 30 minutes and tested again for cure. After standing, the ink again cured at 100 fpm. The example shows that basic fountain solutions do not prevent the curing of the UV light cationic inks of the present invention.

Those skilled in the art having the benefit of the teachings of the present invention as here in above set forth, can effect numerous modifications thereto. These modifications are to be construed as being encompassed within the scope of the present invention as set forth in the appended claims.

What is claimed is:

1. An offset lithographic printing process comprising:
   a) contacting a lithographic printing plate with fountain solution and an ink containing:
      (i) a diluent polymerizable by cationic addition polymerization;
      (ii) a cationic catalyst photoinitiator;
      (iii) rheology modifying resin binder that is soluble in said diluent; and
      (iv) colorant; and
   b) exposing said fountain solution and ink mixture to ultra violet light thereby producing a catalyst that cationically cures the ink in the presence of said fountain solution.

2. The process of claim 1 wherein said rheology modifier selected from modifying resin is high molecular weight rosin esters that include maleated, phenolic and/or pentaerythritol modified rosin esters.

3. The process of claim 1 wherein said photoinitiator is selected from mixed triarylsulfonium hexafluoroantimonate salts and mixed triarylsulfonium hexafluorophosphate salts.

4. The process of claim 1 wherein said diluent comprises low molecular weight monomer and/or oligomer, containing cationically polymerizable moieties, selected from ethylenically unsaturated monomers and substituted or unsubstituted oxirane, oxetane and oxolane.

5. The process of claim 1 further comprising heating after exposing to ultra violet light.

6. The process of claim 1 wherein said photoinitiator produces a super acid upon exposure.

* * * * *